May 14, 1935.  H. BANY  2,001,563
CONTROL OF CIRCUIT BREAKERS
Filed Aug. 15, 1934
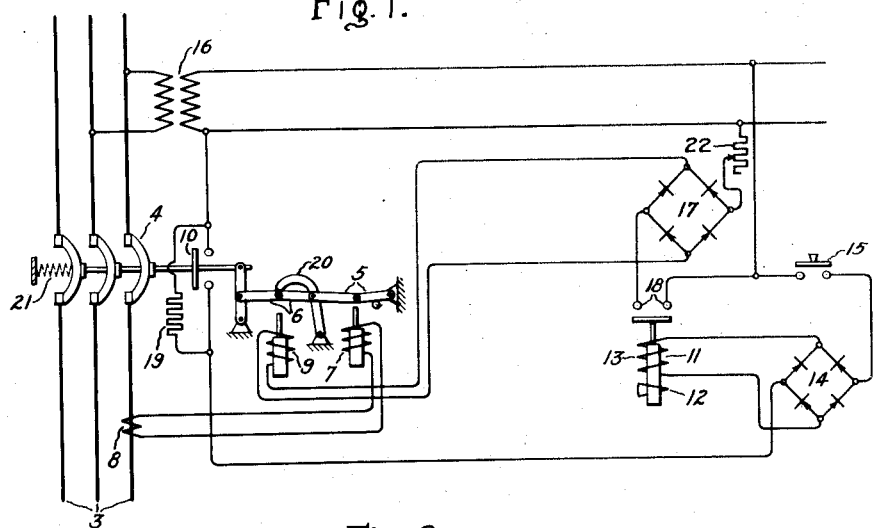
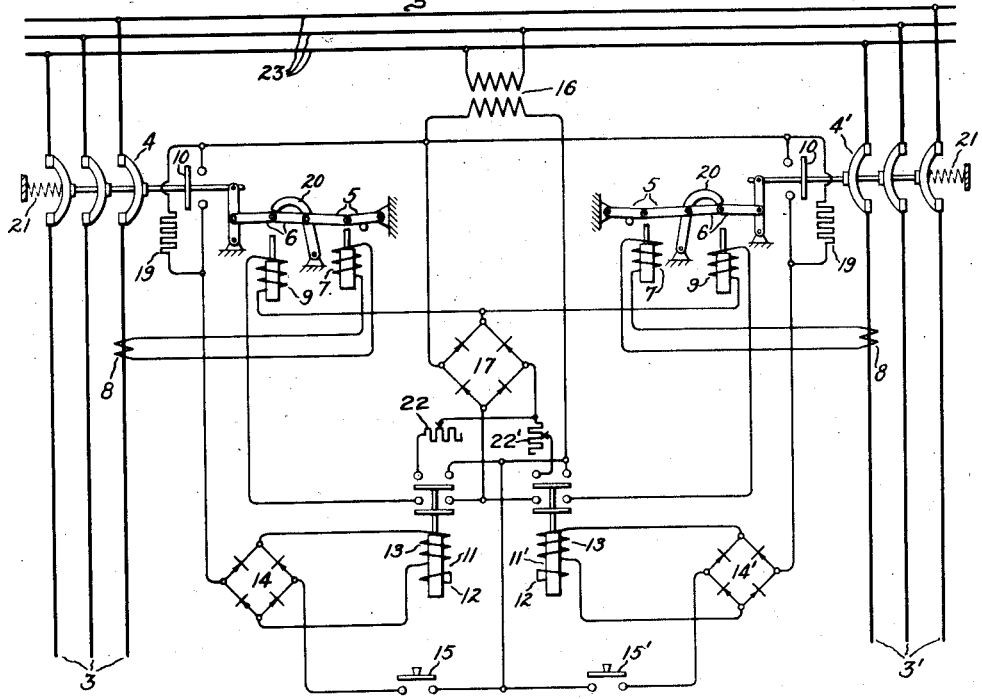
Inventor:
Herman Bany,
by Harry E. Dunham
His Attorney.

Patented May 14, 1935

2,001,563

UNITED STATES PATENT OFFICE 2,001,563

CONTROL OF CIRCUIT BREAKERS

Herman Bany, Lansdowne, Pa., assignor to General Electric Company, a corporation of New York Application August 15, 1934, Serial No. 739,921

6 Claims. (Cl. 175—294)

My invention relates to improvements in the control of circuit breakers and more particularly to the closing of circuit breakers in alternating current circuits, and an object of my invention is to provide an improved control arrangement for closing circuit breakers such that the energization necessary to close the circuit breaker is derived from the alternating current circuit itself or another source of alternating current without resort to any auxiliary source of direct current. Other objects of my invention will appear hereinafter.

Since direct current closing mechanisms are inherently more simple and less expensive than alternating current closing mechanisms, it is preferable to use the former wherever possible. Also, where the closing of circuit breakers is controlled by relays of the hesitating control type whose drop-out delay after deenergization is dependent on a purposely delayed decay of a unidirectional flux in order to insure a positive latching of the circuit breaker, it is necessary to energize the relay by a unidirectional current. Batteries have been used for this purpose and a circuit breaker closing mechanism energized from these batteries. Such batteries for installations containing only one or a relatively small number of circuit breakers are an appreciable item of expense and require a certain amount of maintenance. In order to avoid these features, I provide means whereby hesitating control relays of the type mentioned may be used with direct current circuit breaker closing mechanisms, all energized from alternating current alone, without using batteries or the like and without requiring additional circuit controlling devices. Also, in accordance with my invention, I provide a relatively simple and economical means for independently controlling any one of a plurality of circuit breakers in a plurality of alternating current circuits solely by the use of alternating current which may be taken from the source of supply to the circuits.

My invention will be better understood from the following description when considered in connection with the accompanying drawing, and its scope will be pointed out in the appended claims.

In the accompanying drawing, Fig. 1 illustrates diagrammatically a circuit breaker closing control arrangement embodying my invention and Fig. 2 illustrates diagrammatically a modification of my invention for independently controlling the closing of any one of a plurality of circuit breakers.

In the embodiment of my invention illustrated in Fig. 1, an alternating current circuit 3 is provided with a circuit breaker 4 shown as having a trip-free operating mechanism, that is, the circuit breaker cannot be held closed when closed while a fault exists on the circuit. The particular trip-free mechanism, chosen only for schematic illustration is disclosed in United States Letters Patent 962,958, issued June 28, 1910. This mechanism comprises a tripping toggle 5 and a closing toggle 6, both over-center in the closed position of the circuit breaker. For tripping the circuit breaker there is provided a trip coil 7 which may be responsve to predetermined abnormal current circuit conditions and energized from a current transformer 8. For setting the closing toggle 6 to close the circuit breaker when the tripping toggle 5 is over-center, there is provided a closing coil 9 illustrated as of the solenoid type. The circuit breaker 4 may also be provided with an auxiliary switch 10, closed when the circuit breaker is open and vice versa, for purposes hereinafter to appear.

For controlling the closing operation of the circuit breaker 4 in accordance with my invention, I provide a control relay 11 of the so-called hesitating type. This relay has a short-circuited winding 12 which, upon deenergization of the main winding 13 subsequently to the energization thereof by a unidirectional current, retards the decay of flux in the relay iron and thereby delays the drop-out or, as illustrated, the circuit opening operation of the relay. In order that such a relay may be used with alternating current circuits without the necessity for batteries and the like, I provide suitable rectifying means 14 which may be a full wave rectifier as illustrated. The so-called dry type, copper oxide rectifiers may be used, if desired.

For effecting the operation of the hesitating control relay 11 when a circuit breaker closing operation is desired, any suitable switching means 15, either manual or automatic may be employed. The switching means 15 is arranged to connect the rectifier 14 for energization from any suitable alternating current source available in the station. Thus the rectifier 14 may be connected across the secondary of a potential transformer 16 connected to the circuit 3. Obviously where the voltage of the circuit controlled by the circuit breaker 4 is variable a separate source of substantially constant voltage may be provided for energizing the rectifier.

Since circuit breaker closing mechanisms, especially of the solenoid type, are more economical both in first cost as well as in maintenance and operation when constructed for and operated on direct current, I arrange to have the closing coil 9 connected for energization from the circuit 3 through suitable rectifying means 17. This rectifying means may be a full wave rectifier which is arranged to be connected through the contacts 18 of the relay 11 to the potential transformer 16 or to a source of substantially constant voltage alternating current. The rectifier 17 may also be of the so-called dry or copper oxide type.

In order to be certain of the required voltage in the closing coil 9 to allow for the voltage drop in the rectifier 17 and the drooping characteristic thereof dependent on the load and also for the aging of the rectifier which increases its internal resistance, I provide an adjustable resistance 22 connected in the alternating current side of the rectifier.

With circuit breakers having trip-free mechanisms there may be provided, in order to prevent pumping of the circuit breaker, that is, repeated opening and closing, as long as the fault lasts and the closing control switch 15 is maintained closed, a resistance 19 which is connected across the circuit breaker auxiliary switch 10. This resistance is so proportioned that when the auxiliary switch 10 opens upon the closing of the circuit breaker and the closing control switch 15 is still closed, enough current flows to hold the hesitating control relay 11 in the circuit closing position if it is already there, but not enough to pick it up for movement to this position.

Assuming the parts positioned as shown in Fig. 1, then if the current in the circuit 3 exceeds the amount for which the trip coil is to respond, the tripping toggle of the circuit breaker 5 will be moved upwards beyond its over-center position so that it can collapse. The closing toggle abutment and stop member 20 is then free to swing to the right under the bias of the circuit breaker opening spring 21 and the closing toggle 6 collapses. Upon collapse of this toggle, the abutment and stop member 20 swings to the left, resetting the tripping toggle 5 so that the circuit breaker 4 is again in position to be closed. Closing of the control switch 15 either manually or by any one of the devices used in automatic stations connects the hesitating control relay 11 to the circuit 3 for energization through the rectifier 14. This relay, upon closure of its contacts, connects the closing coil 9 to the circuit through the rectifier 17, whereupon the closing of the circuit breaker is effected. The delayed drop-out of the relay 11 is sufficient to insure the positive closing of the circuit breaker even though the closing control switch 15 is opened shortly after the control relay is energized.

In the event that the circuit breaker 4 is closed on a faulty circuit, the trip coil 7 will be immediately energized to trip the toggle 5 and the circuit breaker 4 will open. If, however, the closing control switch 15 has been held closed during this time, the control relay 11 will be in the circuit closing position, thereby maintaining the closing coil 9 energized so that the closing toggle 6 will be held in the over-center position. Inasmuch, however, as the tripping toggle 5 is collapsed, the energization of the closing coil 9 does not effect the closing of the circuit breaker 4. The only way this can be brought about is to open the switch 15, which permits the control relay 11 to drop out and thereby deenergizes the closing coil 9. The closing toggle 6 may then collapse to permit the movement of the abutment and stop member 20 to the left to reset the tripping toggle 5. The circuit breaker may then be closed as previously described.

In the embodiment of my invention shown in Fig. 2, I have illustrated an alternating current system comprising a plurality of circuits 3, 3′ which are arranged to be connected to a bus 22 through circuit breakers 4, 4′, respectively, which may be trip-free circuit breakers of the type shown in Fig. 1. In accordance with my invention, I provide means whereby any circuit breaker may be operated independently of the other through its own hesitating control relay and a rectifier therefor with only a single rectifier for the energization of the closing coils of the circuit breakers. Thus, each of the circuit breakers 4, 4′ is provided with a closing control switch 15, 15′ which when closed connects the control relay 11 or 11′ for energization from the system through its associated rectifier 14 or 14′. The hesitating control relays 11, 11′ in this case are illustrated as double pole devices, either of which when energized connects its associated circuit breaker closing coil to the system through the single rectifier 17 and the potential transformer 16. In this case, since the loads of the circuit breaker closing coils may differ, it is preferable to have an adjustable resistance 22, 22′ for each closing coil circuit. The operation of this embodiment of my invention will be obvious from the description of the operation of the embodiment of my invention shown in Fig. 1.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination with an alternating current circuit, a circuit breaker for controlling said circuit and means for controlling the closing of said circuit breaker including a closing mechanism having an energizing winding and a relay having a delayed drop-out when deenergized subsequently to energization by a unidirectional current for controlling the circuit of said winding, rectifying means arranged to be connected to said circuit for supplying a unidirectional current directly to said relay, and another rectifying means connected to said circuit for supplying a unidirectional current to said closing mechanism winding when said relay picks up.

2. In combination with an alternating current system comprising a plurality of circuits, a circuit breaker in each of a plurality of said circuits and means for controlling the closing of each circuit breaker independently of the others including a closing mechanism having an energizing winding and a relay having a delayed drop-out when deenergized subsequently to energization by a unidirectional current for controlling the circuit of the winding of the associated mechanism, rectifying means for each of said relays arranged to be connected to said system for supplying unidirectional current directly to the associated relay and a single rectifying means connected to the system for supplying unidirectional current to the winding of any circuit breaker closing mechanism when the relay associated with said mechanism picks up.

3. In combination with an alternating current circuit, a circuit breaker for controlling said circuit and means for controlling the closing of said circuit breaker including a closing mechanism having an energizing winding and a relay having a delayed drop-out when deenergized subsequently to energization by a unidirectional current for controlling the circuit of said winding, a full wave rectifier for supplying a unidirectional current directly to said relay, switching means for connecting said rectifier to said circuit and another full wave rectifier for supplying a unidirectional current to said closing mechanism winding and means operated by said relay upon a predetermined energization thereof for connecting said other rectifier to said circuit.

4. In combination with an alternating current system comprising a plurality of circuits, a circuit breaker in each of a plurality of said circuits and means for controlling the closing of any circuit breaker independently of the others including a closing mechanism having an energizing winding and a relay having a delayed drop-out when deenergized subsequently to energization by a unidirectional current for controlling the circuit of the winding of the associated mechanism, a full wave rectifier for each of said relays for supplying a unidirectional current thereto, switching means for selectively connecting said restifiers to said system, a single full wave rectifier for supplying unidirectional current to the winding of any circuit breaker closing mechanism and means for connecting said single rectifier to said system upon a predetermined energization of any one of said relays.

5. In combination with an electric circuit, a circuit breaker for controlling said circuit and means for controlling the closing of said circuit breaker including a closing mechanism having an energizing winding and a relay having a delayed drop-out when deenergized subsequently to energization by a unidirectional current for controlling the circuit of said winding, rectifying means for supplying a unidirectional current directly to said relay, means for supplying alternating current to said rectifying means, and another rectifying means connected to said alternating current supply for supplying a unidirectional current to said closing mechanism winding when said relay picks up.

6. In combination with an electric system comprising a plurality of circuits, a circuit breaker in each of a plurality of said circuits and means for controlling the closing of each circuit breaker independently of the others including a closing mechanism having an energizing winding and a relay having a delayed drop-out when deenergized subsequently to energization by a unidirectional current for controlling the circuit of the winding of the associated mechanism, rectifying means for each of said relays for supplying unidirectional current directly to the associated relay, means for supplying an alternating current to said rectifying means and a single rectifying means connected to said alternating current supply for supplying unidirectional current to the winding of any circuit breaker closing mechanism when the relay associated with said mechanism picks up.

HERMAN BANY.